United States Patent
Yun et al.

(10) Patent No.: US 10,644,915 B2
(45) Date of Patent: May 5, 2020

(54) DEVICE AND METHOD FOR REDUCING PEAK-TO-AVERAGE POWER RATIO IN WIRELESS COMMUNICATION SYSTEM

(71) Applicants: Samsung Electronics Co., Ltd., Gyeonggi-do (KR); Postech Academy-Industry Foundation, Gyeongsangbuk-do (KR)

(72) Inventors: Yeohun Yun, Gyeonggi-do (KR); Jubum Kim, Gyeongsangbuk-do (KR); Joonho Cho, Gyeongsangbuk-do (KR); Chanhong Kim, Gyeonggi-do (KR)

(73) Assignees: Samsung Electronics Co., Ltd (KR); Postech Academy-Industry Foundation (KR)

( * ) Notice: Subject to any disclaimer, the term of this patent is extended or adjusted under 35 U.S.C. 154(b) by 0 days.

(21) Appl. No.: 16/389,409

(22) Filed: Apr. 19, 2019

(65) Prior Publication Data
US 2019/0327120 A1    Oct. 24, 2019

(30) Foreign Application Priority Data
Apr. 19, 2018 (KR) .......... 10-2018-0045695

(51) Int. Cl.
*H04L 27/26* (2006.01)
*H04L 27/36* (2006.01)

(52) U.S. Cl.
CPC .......... *H04L 27/2621* (2013.01); *H04L 27/36* (2013.01)

(58) Field of Classification Search
CPC .... H04L 27/2621; H04L 27/263; H04L 27/36
See application file for complete search history.

(56) References Cited

U.S. PATENT DOCUMENTS

| | | | |
|---|---|---|---|
| 2006/0146692 A1* | 7/2006 | Gorokhov | H04B 7/04 370/208 |
| 2007/0211807 A1* | 9/2007 | Han | H04L 27/2621 375/260 |
| 2017/0134205 A1 | 5/2017 | Kim et al. | |

FOREIGN PATENT DOCUMENTS

WO    WO 2017178871    10/2017

OTHER PUBLICATIONS

Kuchi, Kiran, Partial Response DFT-precoded-OFDM modulation, Trans. Emerging Tel. Tech., May 10, 2012, 632-645, Copyright 2012 John Wiley & Sons, Ltd.

* cited by examiner

*Primary Examiner* — David S Huang
(74) *Attorney, Agent, or Firm* — The Farrell Law Firm, P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for operating a transmission device in a wireless communication system is provided. The method includes generating modulation symbols based on a modulation scheme, generating transformed data by applying a modified Fourier transform to the modulation symbols, generating a transmission signal based on the transformed data, and transmitting the transmission signal. The modified Fourier transform applies to each of the modulation symbols an amount of phase change that is shifted from an amount of reference phase change by a phase offset.

20 Claims, 14 Drawing Sheets

DEVICE AND METHOD FOR REDUCING PEAK-TO-AVERAGE POWER RATIO IN WIRELESS COMMUNICATION SYSTEM

CROSS-REFERENCE TO RELATED APPLICATION(S)

This application is based on and claims priority under 35 U.S.C. 119 to Korean Patent Application Serial No. 10-2018-0045695, filed on Apr. 19, 2018, in the Korean Intellectual Property Office, the entire disclosure of which is incorporated herein by reference.

BACKGROUND

1. Field

The disclosure relates generally to a wireless communication system for reducing a peak-to-average power ratio (PAPR) in a wireless communication system.

2. Description of Related Art

The above information is presented as background information only to assist with an understanding of the disclosure. No determination has been made, and no assertion is made, as to whether any of the above might be applicable as prior art with regard to the disclosure.

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. In order to provide a wider cell coverage, it is required to improve performance of a user equipment (UE) positioned at a cell edge. Particularly, from the viewpoint of PAPR, increasing the power of signals transmitted by the UE positioned at the cell edge can improve the performance regarding the UE. However, in this case, the PAPR of signals transmitted by the UE may be a problem due to the performance of the amplifier of the UE and/or the battery capacity thereof.

SUMMARY

Based on the above review, the disclosure provides a device and a method for reducing the peak-to-average power ratio (PAPR) in a wireless communication system.

In addition, the disclosure provides a device and a method for applying a modified Fourier transform in a wireless communication system.

In addition, the disclosure provides a device and a method for determining filter coefficients in a wireless communication system.

In addition, the disclosure provides a device and a method for determining a Fourier transform scheme in a wireless communication system.

In accordance with the disclosure, a method for operating a transmission device in a wireless communication system is provided. The method includes generating modulation symbols based on a modulation scheme, generating transformed data by applying a modified Fourier transform to the modulation symbols, generating a transmission signal based on the transformed data, and transmitting the transmission signal. The modified Fourier transform applies to each of the modulation symbols an amount of phase change that is shifted from an amount of reference phase change by a phase offset.

In accordance with the disclosure, a transmission device in a wireless communication system is provided. The transmission device includes a control unit configured to generate modulation symbols based on a modulation scheme, generate transformed data by applying a modified Fourier transform to the modulation symbols, and generate a transmission signal based on the transformed data. The transmission device includes a communication unit configured to transmit the transmission signal. The modified Fourier transform applies to each of the modulation symbols an amount of phase change that is shifted from an amount of reference phase change by a phase offset.

A device and a method according to various embodiments apply a modified Fourier transform to modulation symbols such that the peak-to-average power ratio (PAPR) in a transmission signal can be reduced by a relatively large extent.

In addition, a device and a method according to various embodiments use a modified Fourier transform and filter coefficients corresponding to the modified Fourier transform such that application of a filter can be implemented by a real multiplication calculation, and the complexity of calculation can be reduced accordingly.

Effects which can be acquired by the disclosure are not limited to the above described effects, and other effects that have not been mentioned may be clearly understood by those skilled in the art from the following description.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
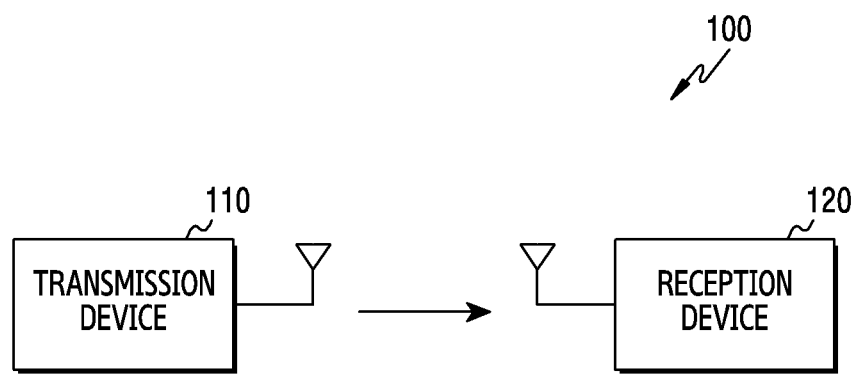
FIG. 1 is a diagram of a wireless communication system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

Terms used in the following description to denote signals, network entities, and constituent elements of devices are examples for facilitating descriptions. Accordingly, the disclosure is not limited to these terms, and other terms having the same or similar technical meanings may also be used.

In addition, although various embodiments will be described with reference to particular communication standards (e.g., 3$^{rd}$ Generation Partnership Project (3GPP)), the terms are only examples for descriptions. Various embodiments can be easily modified and applied to other communication systems.

FIG. 1 is a diagram of a wireless communication system, according to an embodiment. FIG. 1 illustrates a transmission device 110 and a receiving device 120 as parts of nodes that use a wireless channel in a wireless communication system. Although FIG. 1 illustrates a single transmission device 110 and a single receiving device 120, the wireless communication system may include multiple transmitting ends or multiple receiving ends.

Although it will be assumed in this document, for convenience of description, that the transmission device 110 and the receiving device 120 are separate entities, the transmission device 110 and the receiving device 120 may switch functions. In the uplink of a cellular communication system, the transmission device 110 may be a terminal, and the receiving device 120 may be a base station, and in the downlink, the transmission device 110 may be a base station, and the receiving device 120 may be a terminal.

The base station may be referred to as "an access point (AP)", "an eNodeB (eNB)", "a 5$^{th}$ generation (5G) node", "a wireless point", "a transmission/reception point (TRP)", or other terms having equivalent technical meanings. In addition, the terminal may be referred to as "user equipment (UE)", "a mobile station", "a subscriber station", "a remote terminal", "a wireless terminal", "a user device", or other terms having equivalent technical meanings.

The transmission device 110 may transmit signals to the receiving device 120. The transmission device 110 may transmit control information and/or data to the receiving device 120. The receiving device 120 may receive signals from the transmission device 110 and may perform processing for restoring the signals. The transmission device 110 and the receiving device 120 may perform communication with each other through various bands of wireless channels based on a pre-promised wireless standard. The transmission device 110 and the receiving device 120 may transmit and receive radio signals in a millimeter wave (mmWave) band (e.g., 28 GHz, 30 GHz, 38 GHz, or 60 GHz). In order to improve the channel gain, the transmission device 110 and the receiving device 120 may perform beamforming. The beamforming includes transmission beamforming and reception beamforming. The transmission device 110 and the receiving device 120 may endow a transmission signal or a reception signal with directivity. To this end, the transmission device 110 and the receiving device 120 may select at least one serving beam through a beam search procedure.

Figure 2:
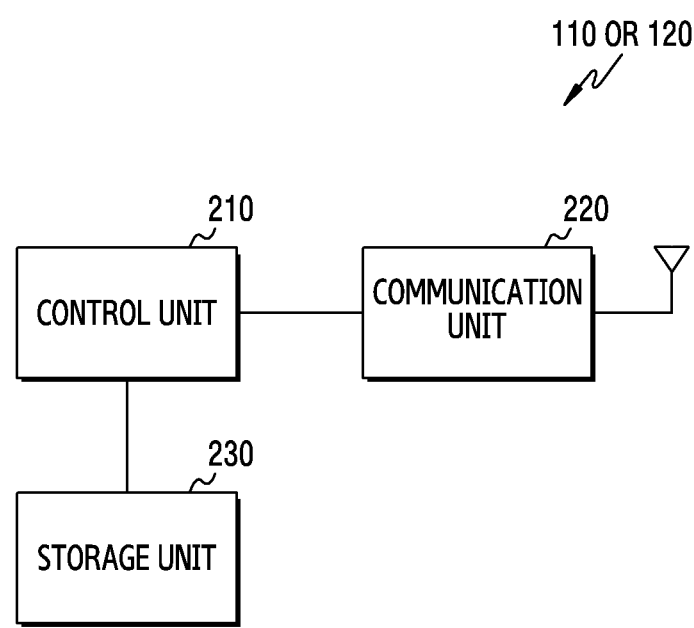
FIG. 2 is a diagram of the configuration of a transmission device in a wireless communication system, according to an embodiment.

FIG. 2 is a diagram of the configuration of a transmission device in a wireless communication system, according to an embodiment. The configuration illustrated in FIG. 2 may be understood as the configuration of the transmission device 110. The term "unit" or "-er" used hereinafter refers to a unit for processing at least one function or operation, and may be implemented as hardware, software, or a combination of hardware and software.

Referring to FIG. 2, the transmission device includes a communication unit 210, a storage unit 220, and a control unit 230.

The communication unit 210 performs functions for transmitting/receiving signals through a wireless channel. The communication unit 210 performs a function of conversion between a baseband signal and a bit stream according to a physical layer standard of the system. When data is transmitted, the communication unit 210 generates complex symbols by encoding and modulating a transmission bit stream. Also, when data is received, the communication unit 210 restores a reception bit stream by demodulating and decoding a baseband signal. The communication unit 210 up-converts a baseband signal into a RF band signal and transmits the same through an antenna, and down-converts an RF band signal received through the antenna into a baseband signal. The communication unit 210 may include a transmission filter, a reception filter, an amplifier, a mixer, an oscillator, a DAC, an ADC, and the like.

The communication unit 210 may include multiple transmission/reception paths. The communication unit 210 may include at least one antenna array made of multiple antenna elements. In terms of hardware, the communication unit 210 may be configured as a digital circuit and an analog circuit (for example, a radio frequency integrated circuit (RFIC)). The digital circuit and the analog circuit may be implemented as a single package. The communication unit 210 may include multiple RF chains. The communication unit 210 may perform beamforming.

The communication unit 210 transmits and receives signals as described above. Accordingly, all or part of the communication unit 210 may be referred to as "a transmission unit", "a reception unit", "a transmission/reception unit", or a transceiver. In addition, transmission and reception performed through a wireless channel, as used in the following description, are to be understood as including the above-described processing performed by the communication unit 210.

The storage unit 220 stores data, such as a basic program for operating the terminal, an application program, configuration information, etc. The storage unit 220 may be configured as a volatile memory, a non-volatile memory, or a combination of a volatile memory and a non-volatile memory. In addition, the storage unit 220 provides the stored data at a request of the control unit 230.

The control unit 230 controls overall operations of the transmission device. The control unit 230 transmits and receives signals through the communication unit 210. In addition, the control unit 230 records data in the storage unit 230 and reads the same. The control unit 230 may perform functions of a protocol stack required by the communication standard. The control unit 230 may include at least one processor or microprocessor, or may be a part of a processor. Moreover, the control unit 230 and a part of the communication unit 210 may be referred to as a communication processor (CP).

The control unit 230 may generate modulation symbols based on a modulation scheme, may apply a modified Fourier transform to the modulation symbols so as to generate transformed data, may generate a transmission signal based on the transformed data, and may control the communication unit 210 so as to transmit the transmission signal. The control unit 230 may control the transmission device in order to perform operations according to various embodiments described later.

Figure 3:
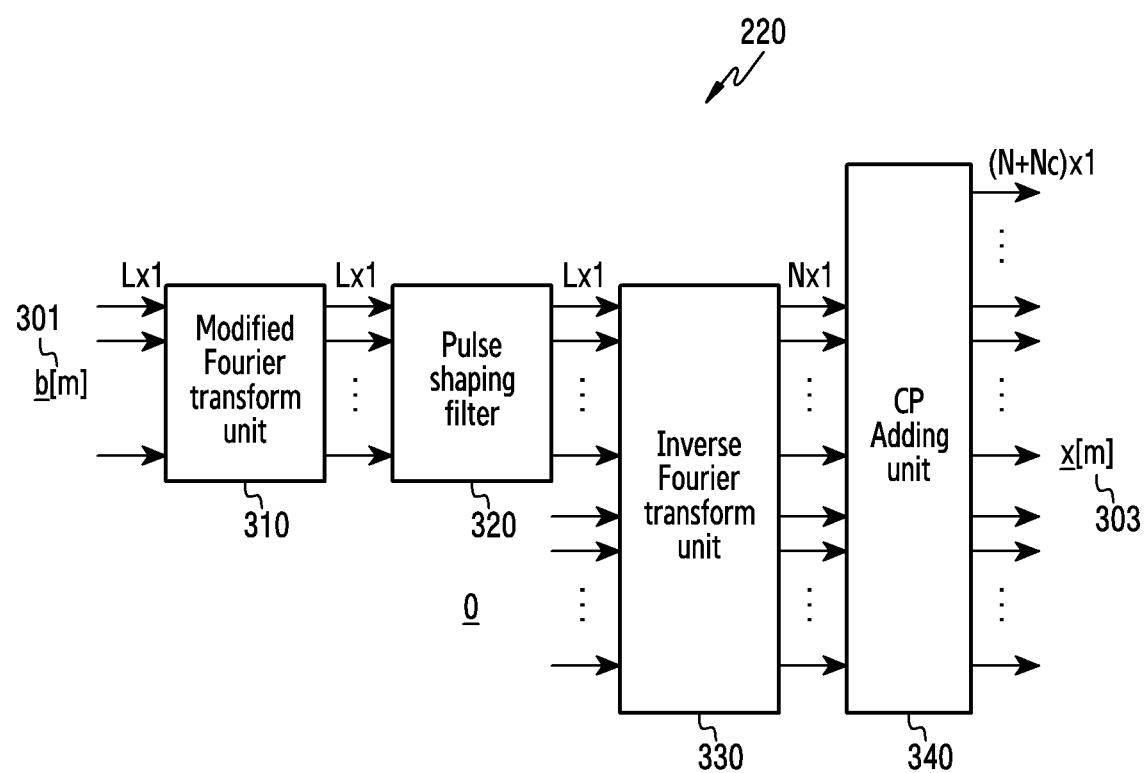
FIG. 3 is a diagram of constituent elements of a communication unit in a wireless communication system, according to an embodiment.

FIG. 3 is a diagram of constituent elements of a communication unit 220 in a wireless communication system, according to an embodiment.

Referring to FIG. 3, the communication unit 220 includes a modified Fourier transform unit 310, a pulse shaping filter 320, an inverse Fourier transform unit 330, and a cyclic prefix (CP) adding unit 340. Such constituent elements of the communication unit 220 may be implemented as hardware, software, or a combination of hardware of software.

Figure 4:
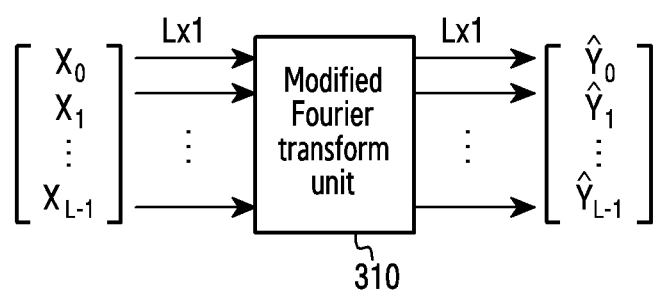
FIG. 4 is a diagram of an input and an output of a modified Fourier transform unit, according to an embodiment.

Referring to FIG. 3, the modified Fourier transform unit 310 may apply a modified Fourier transform to modulation symbols 301 so as to generate transformed data. The modulation symbols 301 may be symbols modulated with regard to L (L is an integer ≥1) subcarriers. In this case, respective modulation symbols 301 may be mapped to the L subcarriers, respectively, and may be expressed as an L×1 matrix (or vector) $\overline{X}=[X_0, X_1, \ldots, X_{L-1}]^T$. The terms "matrix" and "vector" have the same technical meaning, and may be used interchangeably. As illustrated in FIG. 4, the modified Fourier transform unit 310 may apply a modified Fourier transform to the matrix $\overline{X}=[X_0, X_1, \ldots, X_{L-1}]^T$ of modulation symbols 301 so as to generate a modified data matrix $\overline{\hat{Y}}=[\hat{Y}_0, \hat{Y}_1, \ldots, \hat{Y}_{L-1}]^T$.

In this regard, $\overline{\hat{Y}} = \overline{W}_{L,mod}\overline{X}$, and $\overline{W}_{L,mod}$ refers to an L×L modified Fourier transform matrix. The process of applying a modified Fourier transform to the modulation symbols 301 so as to generate transformed data may include a process of multiplying the matrix $\overline{X}$ of modulation symbols 301 by the modified Fourier transform matrix $\overline{W}_{L,mod}$ so as to determine the modified data matrix $\overline{\hat{Y}}$.

Each entry of the modified Fourier transform matrix $\overline{W}_{L,mod}$ may be expressed by Equation 1 below:

$$(\overline{W}_{L,mod})_{(p,q)} = \frac{1}{\sqrt{L}} e^{-\frac{j2\pi\left(p-\frac{L+1}{2}\right)\left(q-\frac{L+1}{2}\right)}{L}}, \quad \text{[Equation 1]}$$

$$\forall p, q \in \{1, 2, \ldots, L\}.$$

In Equation 1, $\overline{W}_{L,mod}$ denotes a modified Fourier transform matrix, p is an index indicating a row of $\overline{W}_{L,mod}$, q is an index indicating a column of $\overline{W}_{L,mod}$, $(\overline{W}_{L,mod})_{(p,q)}$ denotes an entry of $\overline{W}_{L,mod}$ corresponding to row p and column q, and L denotes the number of subcarriers.

When a modified Fourier transform matrix $\overline{W}_{L,mod}$ including entries as defined by Equation 1 is used, each entry of the transformed data matrix $\overline{\hat{Y}}$ may be expressed by Equation 2 below:

$$\hat{Y}_l = \frac{1}{\sqrt{L}} \sum_{k=0}^{L-1} X_k e^{-\frac{j2\pi\left(k-\frac{L-1}{2}\right)\left(l-\frac{L-1}{2}\right)}{L}}. \quad \text{[Equation 2]}$$

In Equation 1, $\hat{Y}_l$ denotes an entry of the transformed data matrix $\overline{\hat{Y}}$ corresponding to transformed data index I, $X_k$ denotes an entry of the matrix $\overline{X}$ of modulation symbols 301 corresponding modulation symbol index k, and L denotes the number of subcarriers.

According to Equation 2, when a modified Fourier transform is used, in order to determine transformed data $\hat{Y}_l$, a magnitude change of $$\frac{1}{\sqrt{L}}$$

times and a phase change of $$-\frac{2\pi\left(k-\frac{L-1}{2}\right)\left(l-\frac{L-1}{2}\right)}{L}$$

are applied to each modulation symbol $X_k$, and respective modulation symbols, the magnitude and phase of which have been changed, are all added up.

An ordinary Fourier transform, instead of the modified Fourier transform, may be applied to modulation symbols 301. An ordinary Fourier transform may be applied to a matrix $\overline{X}$ of modulation symbols 301 so as to generate a transformed data matrix $\overline{Y}=[Y_0, Y_1, \ldots, Y_{L-1}]^T$. In this case, $\overline{Y}=\overline{W}_L\overline{X}$, and $\overline{W}_L$ denotes an L×L ordinary Fourier transform matrix. Each entry of $\overline{W}_L$ may be expressed by Equation 3 below:

$$(\overline{W}_L)_{(p,q)} = \frac{1}{\sqrt{L}} e^{-\frac{j2\pi(p-1)(q-1)}{L}}, \quad \text{[Equation 3]}$$

$$\forall p, q \in \{1, 2, \ldots, L\}.$$

In Equation 3, $\overline{W}_L$ denotes an ordinary Fourier transform matrix, p is an index indicating a row of $\overline{W}_L$, q is an index indicating a column of $\overline{W}_L$, $(\overline{W}_L)_{(p,q)}$ denotes an entry of $\overline{W}_L$ corresponding to row p and column q, and L denotes the number of subcarriers.

Each entry of a transformed data matrix $\overline{Y}$ generated by applying an ordinary Fourier transform may be expressed by Equation 4 below:

$$Y_l = \frac{1}{\sqrt{L}} \sum_{k=0}^{L-1} X_k e^{-\frac{j2\pi kl}{L}}. \quad \text{[Equation 4]}$$

In Equation 4, $Y_l$ denotes an entry of the transformed data matrix $\overline{Y}$ corresponding to transformed data index I, $X_k$ denotes an entry of the matrix $\overline{Y}$ of modulation symbols 301 corresponding modulation symbol index k, and L denotes the number of subcarriers.

The modified Fourier transform and the ordinary Fourier transform may be kinds of discrete Fourier transform (DFT) for DFT-spread (DFT-S). The modified Fourier transform and the ordinary Fourier transform may be preprocessing and/or precoding for reducing the PAPR.

According to Equation 4, when the ordinary Fourier transform is used, in order to determine transformed data $Y_l$, a magnitude change of $$\frac{1}{\sqrt{L}}$$

times and a phase change of $$-\frac{2\pi kl}{L}$$

are applied to each modulation symbol $X_k$, and respective modulation symbols, the magnitude and phase of which have been changed, are all added up. According to various embodiments, the amount of phase change $$-\frac{2\pi kl}{L}$$

applied to each modulation symbol $X_k$ in order to determine transformed data $Y_l$ when the ordinary Fourier transform is used may be referred to as "the amount of reference phase change".

Referring to Equation 1 to Equation 4, when a modified Fourier transform is applied, the amount of phase change $$-\frac{2\pi\left(k-\frac{L-1}{2}\right)\left(l-\frac{L-1}{2}\right)}{L}$$

applied to each modulation symbol $X_k$ in order to determine transformed data $\hat{Y}_l$ may be the amount of phase change when each of the modulation symbol index (k) and the transformed data index (I) has shifted from the amount of reference phase change by $$\frac{L-1}{2}.$$

The amount of phase change that is shifted from the amount of reference phase change by a phase offset may be applied to each modulation symbol by means of the modified Fourier transform, and the amount of phase change that is shifted may correspond to the amount of phase change when the modulation symbol index and the transformed data index are shifted from the amount of reference phase change by $$\frac{L-1}{2}.$$

Accordingly, the phase offset may be determined based on the amount of phase change when the modulation symbol index and the transformed data index are shifted from the amount of reference phase change by $$\frac{L-1}{2}.$$

When the amount of phase change resulting a shift of each of the modulation symbol index and the transformed data index from the amount of reference phase change by $$\frac{L-1}{2}$$

is applied to each modulation symbol according to Equation 1 and Equation 2, the modified Fourier transform may be referred to as "a centered DFT", and the modified Fourier transform matrix $\overline{W}_{L,mod}$ may be expressed as $\overline{W}_{L,cent}$. However, the centered DFT is only an example of the modified Fourier transform, and various types of modified Fourier transforms may be used. Each entry of the modified Fourier transform matrix $\overline{W}_{L,mod}$ may be expressed by Equation 5 below:

$$(\overline{W}_{L,mod})_{(p,q)} = \frac{1}{\sqrt{L}} e^{-\frac{j2\pi\left(p-\frac{L+1}{2}\right)(q-1)}{L}}, \forall p, q \in \{1, 2, \ldots, L\}. \quad \text{[Equation 5]}$$

In Equation 5, $\overline{W}_{L,mod}$ denotes a modified Fourier transform matrix, p is an index denoting a row of $\overline{W}_{L,mod}$, q is an index denoting a column of $\overline{W}_{L,mod}$, $(\overline{W}_{L,mod})_{(p,q)}$ denotes an entry of $\overline{W}_{L,mod}$ corresponding to row p and column q, and L denotes the number of subcarriers.

When a modified Fourier transform matrix $\overline{W}_{L,mod}$ including entries as defined by Equation 5 is used, each entry of the modified data matrix $\overline{Y}$ may be expressed by Equation 6 below:

$$\hat{\overline{Y}}_l = \frac{1}{\sqrt{L}} \sum_{k=0}^{L-1} X_k e^{\frac{j2\pi\left(k-\frac{L+1}{2}\right)l}{L}}. \quad \text{[Equation 6]}$$

In Equation 6, $\hat{Y}_l$ denotes an entry of the modified data matrix $\overline{Y}$ corresponding to transformed data index I, $X_k$ denotes an entry of the matrix $\overline{X}$ of modulation symbols 301 corresponding to modulation symbol index k, and L denotes the number of subcarriers.

When the modified Fourier transform according to Equation 5 and Equation 6 is applied to modulation symbols, the amount of phase change $$-\frac{2\pi\left(k-\frac{L-1}{2}\right)l}{L}$$

applied to each modulation symbol $X_k$ by the modified Fourier transform in order to determine transformed data $\hat{Y}_l$ may be the amount of phase change when the modulation symbol index (k) is shifted from the amount of reference phase change by $$\frac{L-1}{2}.$$

In order to apply the modified Fourier transform, only the modulation symbol index may be shifted from the amount of reference phase change. That is, according to the modified Fourier transform, the amount of phase change assigned to the modulation symbol of index 0 may not be 0.

At least one of the modulation symbol index or the transformed data index may be shifted from the amount of reference phase change by the modified Fourier transform. In addition, the offset that is shifted with regard to the modulation symbol index and/or the transformed data index may be a value other than $$\frac{L-1}{2},$$

and each of the modulation symbol index and the transformed data index may be shifted by a different offset. Accordingly, the phase offset between the amount of phase change resulting from the modified Fourier transform and the amount of reference phase change may be determined based on at least one of a type of the index that is shifted from the amount of reference phase change (e.g., modulation symbol index or transformed data index) or the offset (or amount) by which each index is shifted.

The modified Fourier transform unit 310 illustrated in FIG. 3 may be modified in various manners. For example, when the modified Fourier transform performed by the modified Fourier transform unit 310 is a centered DFT, the modified Fourier transform unit 310 may be replaced with a "centered DFT calculation unit".

Figure 5:
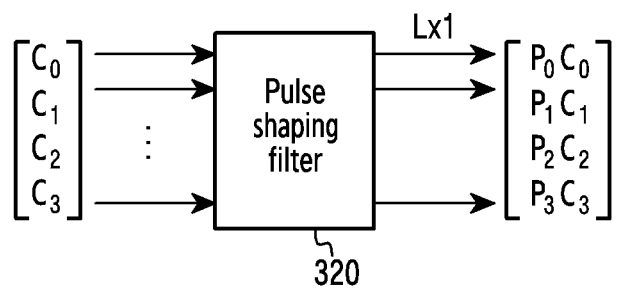
FIG. 5 is a diagram of an input and an output of a pulse shaping filter, according to an embodiment.

The pulse shaping filter 320 may apply a filter to transformed data so as to generate a filter output. The pulse shaping filter 320 may filter transformed data so as to generate filter output. The pulse shaping filter 320 may apply a filter to transformed data so as to determine, shape, or adjust the waveform of a time-domain signal. The process of applying a filter to transformed data may include a process of multiplying transformed data by filter coefficients of the filter. For example, as illustrated in FIG. 5, when transformed data is expressed as L×1 matrix $\overline{Y}=[\hat{Y}_0, \hat{Y}_1, \ldots, \hat{Y}_{L-1}]^T$, and when filter coefficients are expressed as L×1 matrix $\overline{p}=[p_0, p_1, \ldots, p_{L-1}]^T$, the filter output may be expressed as L×1 matrix $\overline{p}_{out}=[p_0\hat{Y}_0, p_1\hat{Y}_1, \ldots, p_{L-1}\overline{Y}_{L-1}]^T$. The pulse shaping filter 320 may generate a filter output matrix $\overline{P}_{out}$ by multiplying entries having the same index in a transformed data matrix $\overline{Y}$ and a filter coefficient matrix $\overline{P}$ in the frequency domain. The entries of the filter coefficient matrix $\overline{p}$ may all have real number values. In addition, the entries of the transformed data matrix $\overline{Y}$ generated by the modified Fourier transform may all have real number values. Accordingly, the process of applying a filter to transformed data may include a process of performing real multiplication between entries of a transformed data matrix and entries of a filter coefficient matrix. The complexity of calculation may be reduced since a filter is applied by performing simple real multiplication.

Filter coefficients of the filter shaping filter 320 may be determined based on the type of the Fourier transform. The type of the Fourier transform may include at least one of a modified Fourier transform or an ordinary Fourier transform. When the type of the Fourier transform applied to modulation symbols is a modified Fourier transform, the filter coefficients of the pulse shaping filter 320 may correspond to the modified Fourier transform. When the type of the Fourier transform applied to modulation symbols is an ordinary Fourier transform, the filter coefficients of the pulse shaping filter 320 may correspond to the ordinary Fourier transform. In addition, multiple modified Fourier transforms may be defined according to the phase offset, and different filter coefficients may correspond to the multiple modified Fourier transforms, respectively. The filter coefficients of the pulse shaping filter 320 may be determined based on the phase offset of the modified Fourier transform. The filter coefficients of the pulse shaping filter 320 may be determined based on at least one of a type of the index that is shifted from the amount of reference phase change or the offset by which each index is shifted.

The filter coefficients of the pulse shaping filter 320 may be predetermined values corresponding to the number of subcarriers having a transmission assigned thereto. The pulse shaping filter 320 may use filter coefficients predetermined to apply a filter to transformed data. A filter coefficient matrix of L×1 including predetermined filter coefficients may be expressed by Equation 7 below:

$$\overline{p_1} = \left[\hat{p}_0, \hat{p}_1, \ldots, \hat{p}_{\frac{L}{2}-1}, \hat{p}_{\frac{L}{2}-1}, \hat{p}_{\frac{L}{2}-2}, \ldots, \hat{p}_0\right]^T. \quad \text{[Equation 7]}$$

In Equation 7, $\overline{p_1}$ denotes a filter coefficient matrix, $\hat{p}$ denotes a filter coefficient, a filter coefficient value, a filter coefficient entry, or an entry of $\overline{p_1}$, and L denotes the number of subcarriers.

Each entry of the filter coefficient matrix $\overline{p_1}$ may be expressed by Table 1 below:

TABLE 1

| | 1 PRB (L = 12) | 2 PRB (L = 24) | 3 PRB (L = 36) | 4 PRB (L = 48) |
|---|---|---|---|---|
| $\hat{p}_0$ | 0.099338049 | 0.043140248 | 0.023187328 | 0.018382158 |
| $\hat{p}_1$ | 0.175744068 | 0.067863539 | 0.033431004 | 0.025201785 |
| $\hat{p}_2$ | 0.252386288 | 0.095117993 | 0.045385822 | 0.032429719 |
| $\hat{p}_3$ | 0.320886005 | 0.125080197 | 0.060196695 | 0.040445092 |
| $\hat{p}_4$ | 0.368484311 | 0.15594572 | 0.077140957 | 0.050013649 |
| $\hat{p}_5$ | 0.395978055 | 0.188785418 | 0.096406146 | 0.060972094 |
| $\hat{p}_6$ | | 0.218388149 | 0.117073231 | 0.072789186 |
| $\hat{p}_7$ | | 0.242928534 | 0.137344162 | 0.0855879 |
| $\hat{p}_8$ | | 0.260169712 | 0.157417746 | 0.099169226 |
| $\hat{p}_9$ | | 0.272554416 | 0.17542864 | 0.1124891 |
| $\hat{p}_{10}$ | | 0.280584896 | 0.191551916 | 0.125604318 |
| $\hat{p}_{11}$ | | 0.285433425 | 0.204571295 | 0.138272359 |
| $\hat{p}_{12}$ | | | 0.21508466 | 0.150157987 |
| $\hat{p}_{13}$ | | | 0.222721416 | 0.160904388 |
| $\hat{p}_{14}$ | | | 0.227885745 | 0.170331647 |
| $\hat{p}_{15}$ | | | 0.231291336 | 0.178415611 |
| $\hat{p}_{16}$ | | | 0.233319361 | 0.18531427 |
| $\hat{p}_{17}$ | | | 0.234558955 | 0.190705012 |
| $\hat{p}_{18}$ | | | | 0.194805207 |
| $\hat{p}_{19}$ | | | | 0.197902251 |
| $\hat{p}_{20}$ | | | | 0.200077138 |
| $\hat{p}_{21}$ | | | | 0.20153159 |
| $\hat{p}_{22}$ | | | | 0.202562424 |
| $\hat{p}_{23}$ | | | | 0.203294771 |

Referring to Table 1, one physical resource block (PRB) includes twelve subcarriers, and n PRB (n≥2) includes 12×n subcarriers. The number of subcarriers and the filter coefficient values enumerated in Table 1 are exemplary, and the number of subcarriers and/or the filter coefficient values may be variously modified. The transmission device may store a table that indicates the relationship between the number of subcarriers to which a transmission signal is allocated and the filter coefficients, as given in Table 1. The transmission device may store filter coefficient values corresponding to the number of subcarriers to which a transmission signal is allocated. The table as given in Table 1 and/or the filter coefficients may be pre-stored or pre-configured in the transmission device. The table as given in Table 1 and/or the filter coefficients may be configured in the transmission device by a higher layer signaling.

The pulse shaping filter 320 may determine filter coefficients based on a table as given in Table 1 and based on Equation 7 and may apply a filter expressed by the determined filter coefficients to transformed data so as to generate a filter output. The pulse shaping filter 320 may use filter coefficient values corresponding to the number of subcarriers determined in advance. The pulse shaping filter 320 may use filter coefficients that are adaptive to and/or scalable to the number of subcarriers. A filter coefficient matrix including filter coefficients that are adaptive to and/or scalable to the number of subcarriers may be expressed by Equation 8 below:

$$\overline{p_2} = W_{L,cent} \begin{bmatrix} \text{zeros}\left(\frac{L}{2}-1, 1\right) \\ \frac{1}{\sqrt{2}} \\ \frac{1}{\sqrt{2}} \\ \text{zeros}\left(\frac{L}{2}-1, 1\right) \end{bmatrix} =$$ [Equation 8]

$$\frac{1}{\sqrt{2}} W_{L,cent} \begin{bmatrix} 0 \\ 0 \\ \vdots \\ 0 \\ 1 \\ 1 \\ 0 \\ 0 \\ \vdots \\ 0 \end{bmatrix} = \frac{1}{\sqrt{2L}} \begin{bmatrix} e^{-\frac{j\pi(L-1)}{2L}} + e^{\frac{j\pi(L-1)}{2L}} \\ e^{-\frac{j\pi(L-3)}{2L}} + e^{\frac{j\pi(L-3)}{2L}} \\ \vdots \\ e^{-\frac{j\pi(-L+1)}{2L}} + e^{\frac{j\pi(-L+1)}{2L}} \end{bmatrix}.$$

In Equation 8, $\overline{p_2}$ denotes a filter coefficient matrix, L denotes the number of subcarriers to which a transmission signal is allocated, $W_{L,cent}$ denotes a centered DFT matrix, and zeros(x, y) denotes an x×y zero matrix, all entries of which are 0. zeros $$\left(\frac{L}{2}-1, 1\right)$$

denotes a $$\frac{L}{2} \times 1$$

zero matrix, all entries of which are 0.

Referring to Equation 8, filter coefficients and/or a filter coefficient matrix $\overline{p_2}$ may be determined with regard to an arbitrary L value. The filter coefficients and/or the filter coefficient matrix may be determined adaptively when the number of subcarriers to which a transmission signal is allocated is given regardless of the number of subcarriers to which a transmission signal is allocated.

Although a centered DEF matrix $W_{L,cent}$ is used in Equation 8, the same is exemplary, and various modifications are possible. When the modified Fourier transform unit 310 has used a modified Fourier transform matrix $\overline{W}_{L,mod}$, a modified Fourier transform matrix $\overline{W}_{L,mod}$ may be used instead of the centered DFT matrix $W_{L,cent}$ in order to determine the filter coefficients and/or the filter coefficient matrix $\overline{p_2}$ in Equation 8. When filter coefficients scalable to the number of subcarriers are used, the same Fourier transform matrix as the Fourier transform matrix used by the modified Fourier transform unit 310 in order to determine filter coefficients may be used.

A "filter coefficient determination rule" may be used to determine whether the transmission device uses predetermined filter coefficients (or filter coefficients extracted from a pre-stored table) such as using Equation 7 and Table 1, or uses filter coefficients that are scalable to the number of subcarriers such as using Equation 8. The filter coefficient determination rule may include at least one of a first rule wherein the transmission device uses predetermined filter coefficients (or filter coefficients extracted from a pre-stored table) such as using Equation 7 and Table 1 or a second rule wherein the transmission device uses filter coefficients that are scalable to the number of subcarriers such as using Equation 8.

As described above, filter coefficients may be determined based on the type of the Fourier transform. Filter coefficients may be determined based on the filter coefficient determination rule. The filter coefficients may be determined based on at least one of the type of the Fourier transform or the filter coefficient determination rule.

The inverse Fourier transform unit 330 may apply an inverse Fourier transform to the filter output so as to generate a time-domain signal. The input of the inverse Fourier transform unit 330 may be a filter output, and the output thereof may be a time-domain signal. The inverse Fourier transform may include at least one of an inverse DFT (IDFT) or an inverse fast Fourier transform (IFFT). More specifically, the inverse Fourier transform unit 330 may apply an N-point inverse Fourier transform (N≥L) to a filter output expressed as an L×1 matrix so as to generate a time-domain signal expressed as an N×1 matrix. The process of applying an N-point inverse Fourier transform to a filter output expressed as an L×1 matrix may include a process of multiplying an L×1 filter output matrix by an N×N inverse Fourier transform matrix. When N>L, the inverse Fourier transform unit 330 may determine that a matrix obtained by coupling an L×1 filter output matrix and an (N−L)×1 zero matrix (a matrix all entries of which are 0) is an input of the inverse Fourier transform unit 330, and may apply an inverse Fourier transform to the corresponding matrix. The time-domain signal generated by the inverse Fourier transform unit 330 may include time-domain samples. A time-domain signal expressed as an N×1 matrix may include N time-domain samples.

When an ordinary Fourier transform is applied to modulation symbols, the amount of reference phase change is applied to each modulation symbol, and the phase difference mismatch occurring in a time-domain signal after an inverse Fourier transform may be relatively large. The phase difference mismatch refers to the degree of mismatch between a phase difference of component signals regarding adjacent subcarriers in the time-domain signal and a phase difference of adjacent modulation symbols. The larger the phase difference mismatch, the smaller the peak power-to-average power ratio (PARR) in the time-domain signal or in the final transmission signal may relatively be, even if a Fourier transform is applied to the modulation symbols.

In contrast, when a modified Fourier transform is applied to modulation symbols, the amount of phase change that is shifted from the amount of reference phase change by a phase offset is applied to each modulation symbol, and the phase difference mismatch occurring in the time-domain signal after an inverse Fourier transform may not occur or may be relatively small. The phase difference mismatch occurring in the time-domain signal when a modified Fourier transform is applied to modulation symbols may be smaller than when applying an ordinary Fourier transform to modulation symbols. Accordingly, applying a modified Fourier transform to modulation symbols may reduce the PAPR by a relatively large extent in the time-domain signal or in the final transmission signal.

The CP adding unit 340 may add a CP to a time-domain signal generated by the inverse Fourier transform unit 330 so as to generate a transmission signal 303. The CP may include Nc (<N) time-domain samples among N time-domain samples of the time-domain signal. The CP may include Nc samples extracted from the end part of the time-domain signal. The CP adding unit 340 may add a CP including Nc time-domain samples to the front part of the time-domain signal including N time-domain samples so as to generate a transmission signal 303 including (N+Nc) time-domain samples. The communication unit 220 may transmit the generated transmission signal 303 or process the transmission signal 303 for transmitting the same.

Although not illustrated, the communication unit 220 may generate modulation symbols 301 based on a modulation scheme. The modulation scheme may include at least one of quadrature phase shift keying (QPSK), 16 QAM, 64 QAM, or 256 QAM. The modulation scheme may include a scheme for modulating symbols such that the phase difference between adjacent modulation symbols is π/2. As used herein, adjacent modulation symbols denote modulation symbols of adjacent subcarriers or symbols modulated from adjacent subcarriers. For example, the scheme for modulating symbols such that the phase difference between adjacent modulation symbols is π/2 may include π/2-binary phase shift keying (BPSK).

Figure 6:
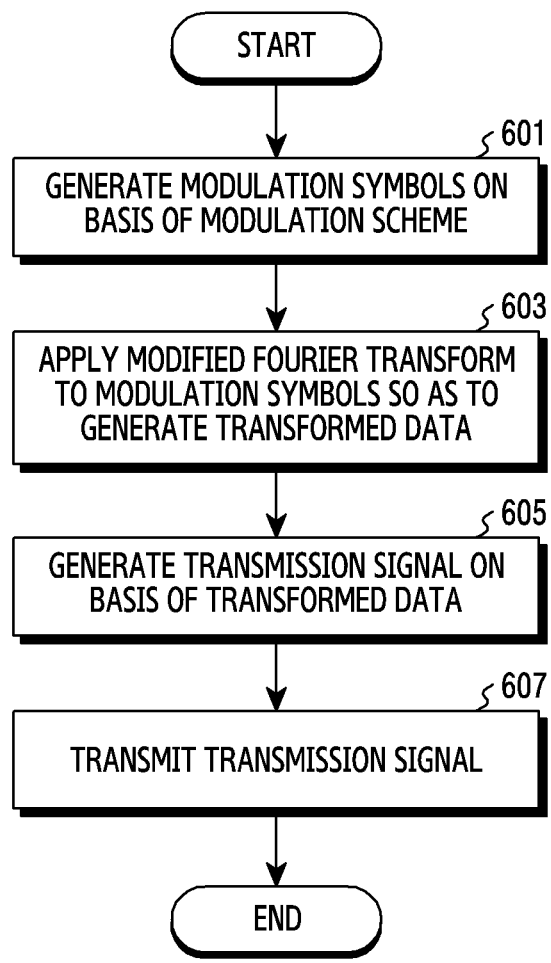
FIG. 6 is a flowchart of a method of operating a transmission device in a wireless communication system, according to an embodiment.

FIG. 6 is a flowchart of a method of operating a transmission device in a wireless communication system, according to an embodiment. FIG. 6 illustrates exemplary operations of the transmission device 110.

Referring to FIG. 6, at step 601, the transmission device generates modulation symbols based on a modulation scheme. The modulation scheme may include at least one of QPSK, 16QAM, 64OQAM, or 256QAM. The modulation scheme may include a scheme for modulating symbols such that the phase difference between adjacent modulation symbols is π/2. The scheme for modulating symbols such that the phase difference between adjacent modulation symbols is π/2 may be π/2 BPSK.

At step 603, the transmission device applies a modified Fourier transform to the modulation symbols so as to generate transformed data. The transmission device may apply a modified Fourier transform to modulation symbols such that each modulation symbol is spread across multiple subcarriers. The modified Fourier transform may apply the amount of phase change that is shifted from the amount of reference phase change by a phase offset to respective modulation symbols. The amount of reference phase change may be the amount of phase change applied to respective modulation symbols when an ordinary Fourier transform is applied to the modulation symbols, and the phase offset may be determined based on at least one of the type of the index that is shifted from the amount of reference phase change or the offset by which each index is shifted.

At step 605, the transmission device generates a transmission signal based on transformed data. The transmission device may apply a filter for shaping the waveform of the transmission signal to the transformed data so as to generate a filter output, may apply an inverse Fourier transform to the generated filter output so as to generate a time-domain signal, and may insert a CP into the time-domain signal so as to generate a transmission signal. The operation of applying a filter to transformed data may include an operation of multiplying each entry of the transformed data matrix by each of the filter coefficients of the filter. The filter coefficients may all be real number values. In addition, entries of the transformed data matrix generated by the modified Fourier transform may all be real number values. The operation of applying a filter to transformed data may be implemented by a real multiplication calculation and may reduce the complexity of implementation. The phase difference mismatch occurring in the time-domain signal when a modified Fourier transform is applied may be smaller than when applying an ordinary Fourier transform. The phase difference mismatch may refer to the degree of mismatch between a phase difference of component signals regarding adjacent subcarriers in the time-domain signal and a phase difference of adjacent modulation symbols among the modulation symbols. When a modified Fourier transform is applied, the phase difference mismatch is reduced, and the PAPR in the transmission signal may be substantially reduced.

At step 607, the transmission device transmits the transmission signal. The transmission device may up-convert the transmission signal to a radio frequency (RF) signal and may transmit the up-converted RF signal. The transmission device may selectively apply beamforming to the RF signal according to the frequency band of the RF signal.

At step 603, in order for the transmission device to apply a filter to the transformed data, the transmission device may determine filter coefficients of the filter. The filter coefficients may be determined based on at least one of the type of the Fourier transform or the filter coefficient determination rule. Hereinafter, a method of determining filter coefficients based on the type of the Fourier transform will be described with reference to FIG. 7, and a method of determining filter coefficients based on the filter coefficient determination rule will be described with reference to FIG. 8.

Figure 7:
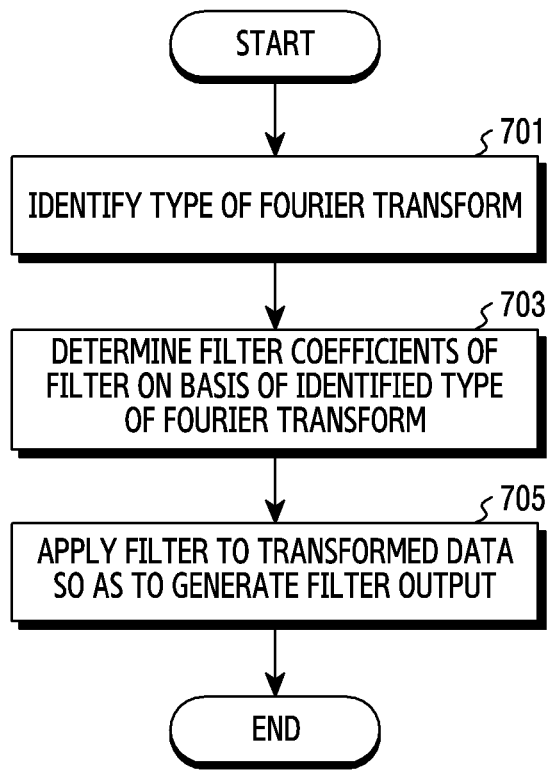
FIG. 7 is a flowchart of a method of operating a transmission device for determining filter coefficients based on the type of the Fourier transform in a wireless communication system, according to an embodiment.

FIG. 7 is a flowchart of a method of operating a transmission device for determining filter coefficients based on the type of the Fourier transform in a wireless communication system, according to an embodiment. FIG. 7 illustrates exemplary operations of the transmission device 110.

Referring to FIG. 7, at step 701, the transmission device identifies the type of the Fourier transform. The type of the Fourier transform may include at least one of a modified Fourier transform or an ordinary Fourier transform. When the modified Fourier transform is used, the type of the Fourier transform may include the phase offset of the modified Fourier transform. The type of the Fourier transform may vary depending on the phase offset of the modified Fourier transform, and different types of Fourier transforms may be defined with regard to different phase offsets. The ordinary Fourier transform may be identical to the case in which the modified Fourier transform has a phase offset of 0.

At step 703, the transmission device determines filter coefficients of the filter based on the identified type of the Fourier transform. When the identified type of the Fourier transform is an ordinary Fourier transform, the transmission device may determine filter coefficients corresponding to the ordinary Fourier transform. When the identified type of the Fourier transform is a modified Fourier transform, the transmission device may determine filter coefficients corresponding to the phase offset of the modified Fourier transform. The filter coefficients may be determined based on the phase offset of the modified Fourier transform. Since the phase offset of the modified Fourier transform may be defined variously, filter coefficients corresponding to each phase offset may be defined. Different filter coefficients may correspond to different phase offsets. Different filter coefficients may correspond to at least a part of different phase offsets, and identical filter coefficients may correspond to another part thereof.

At step 705, the transmission device applies a filter to transformed data so as to generate filter output. The transmission device may multiply respective filter coefficients of the filter in the frequency domain by respective entries of the transformed data matrix so as to generate a filter output.

Figure 8:
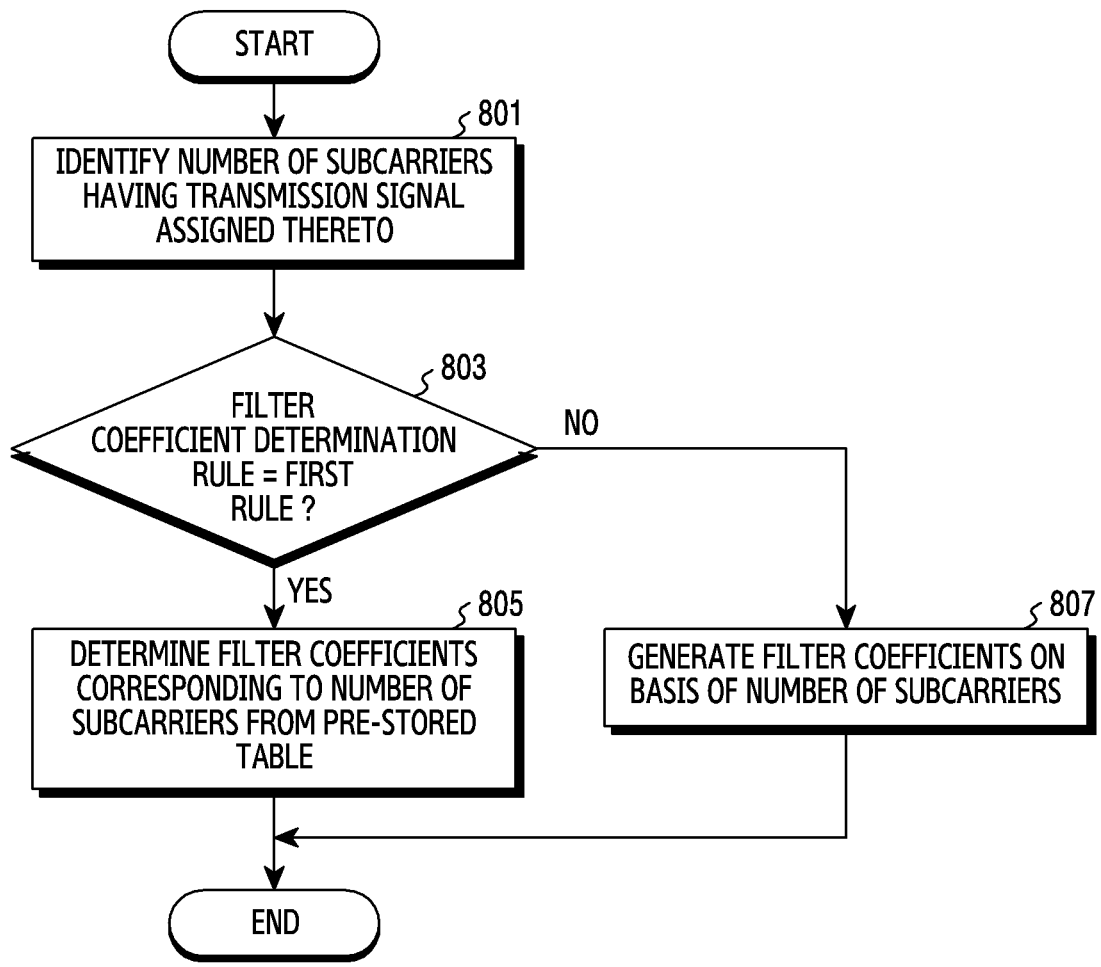
FIG. 8 is a flowchart of a method of operating a transmission device for determining filter coefficients based on a filter coefficient determination rule in a wireless communication system, according to an embodiment.

FIG. 8 is a flowchart of a method of operating a transmission device for determining filter coefficients based on a filter coefficient determination rule in a wireless communication system, according to an embodiment. For example, FIG. 8 illustrates exemplary operations of the transmission device 110.

Referring to FIG. 8, at step 801, the transmission device identifies the number of subcarriers to which a transmission signal is allocated. The transmission signal may be assigned in a PRB unit, and a single PRB may include twelve subcarriers. In order to identify the number of subcarriers to which a transmission signal is allocated, the transmission device may identify the number of PRBs to which a transmission signal is allocated.

At step 803, the transmission device determines whether or not the filter coefficient determination rule is a first rule. The filter coefficient determination rule may include at least one of a first rule wherein the transmission device uses predetermined filter coefficients (or filter coefficients extracted from a pre-stored table) such as using Equation 7 and Table 1 or a second rule wherein the transmission device uses filter coefficients that are scalable to the number of subcarriers such as using Equation 8.

When the filter coefficient determination rule is the first rule, at step 805, the transmission device determines filter coefficients corresponding to the number of subcarriers in a pre-stored table. The transmission device may extract filter coefficients corresponding to the number of subcarriers from a pre-stored table such as Table 1 based on Equation 7, and may use the extracted filter coefficients. The transmission device may determine filter coefficients corresponding to the number of subcarriers among predetermined filter coefficients stored in the transmission device.

When the filter coefficient determination rule is not the first rule, or when the first coefficient determination rule is the second rule, at step 807, the transmission device generates filter coefficients based on the number of subcarriers. The transmission device may generate filter coefficients based on the number of subcarriers and Equation 8. The transmission device may determine filter coefficients with regard to an arbitrary number of subcarriers. The transmission device may adaptively determine filter coefficients when the number of subcarriers is given regardless of the number of subcarriers to which a transmission signal is allocated.

The transmission device may determine the type of the Fourier transform. The transmission device may determine whether to use a modified Fourier transform or to use an ordinary Fourier transform. Hereinafter, operations of the transmission device for determining the type of the Fourier transform will be described with reference to FIG. 9.

Figure 9:
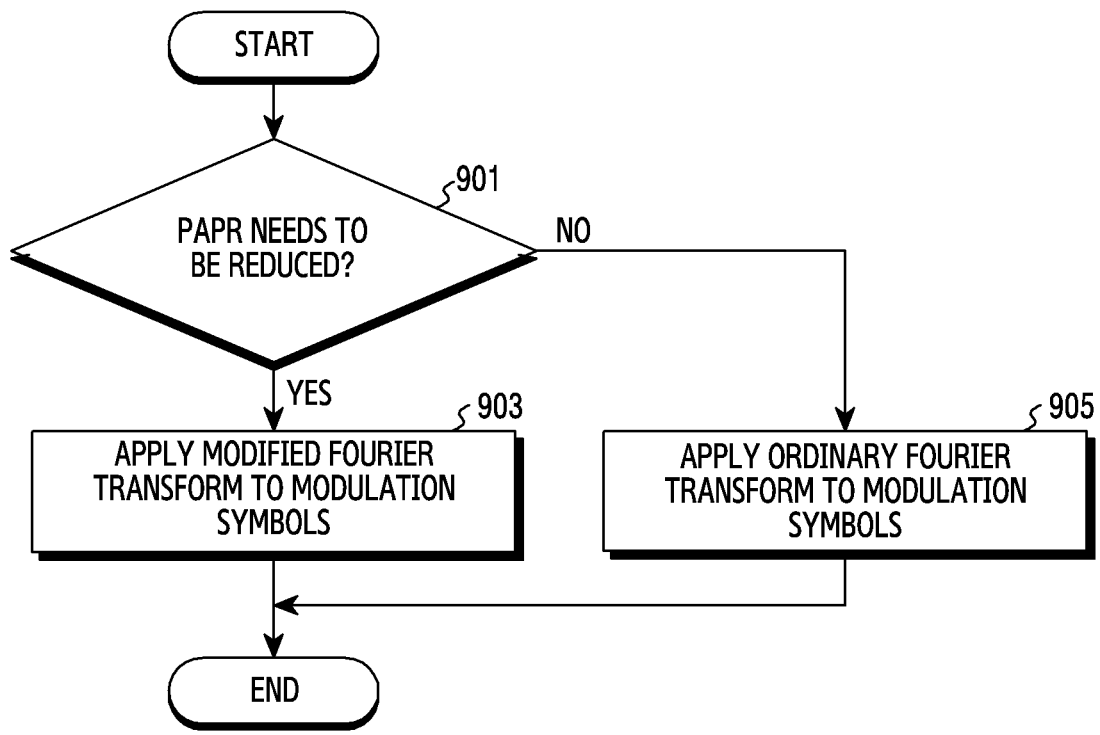
FIG. 9 is a flowchart of a method of operating a transmission device for determining a Fourier transform type in a wireless communication system, according to an embodiment.

FIG. 9 is a flowchart of a method of operating a transmission device for determining a Fourier transform type in a wireless communication system, according to an embodiment. For example, FIG. 9 illustrates exemplary operations of the transmission device 110.

Referring to FIG. 9, at step 901, the transmission device determines whether or not the PAPR needs to be reduced. The transmission device may determine whether or not the PAPR needs to be reduced based on at least one of the channel quality, the modulation order, the number of subcarriers to which a transmission signal is allocated, a type of information included in the transmission signal, the subcarrier interval, the battery power level of the transmission device, the battery capacity of the transmission device, or the performance of the power amplifier of the transmission device. More specifically, the transmission device may determine that the PAPR needs to be reduced when the channel quality is poor, when the modulation order is low, when the number of subcarriers to which a transmission signal is allocated is small, when a type of information included in the transmission signal is control information (e.g., physical uplink control channel (PUCCH)), when the subcarrier interval is large, when the battery power level of the transmission device and/or the battery capacity thereof are low, or when the performance of the power amplifier of the transmission device is poor.

When the PAPR needs to be reduced, at step 903, the transmission device applies a modified Fourier transform to modulation symbols. When the PAPR needs to be reduced, the transmission device may determine a modified Fourier transform as the type of the Fourier transform. Since the PAPR may be reduced by a relatively large extent by applying a modified Fourier transform to modulation symbols, the transmission device may determine a modified Fourier transform as the type of the Fourier transform when the PAPR needs to be reduced, and may apply the modified Fourier transform to modulation symbols.

When the PAPR does not need to be reduced, at step 905, the transmission device applies an ordinary Fourier transform to modulation symbols. When the PAPR does not need to be reduced, the transmission device may determine an ordinary Fourier transform as the type of the Fourier transform. When an ordinary Fourier transform is applied, the PAPR is reduced by a relatively small extent but, since there is no need to reduce the PAPR, the transmission device may determine an ordinary Fourier transform as the type of the Fourier transform and may apply the ordinary Fourier transform to modulation symbols.

Figure 10:
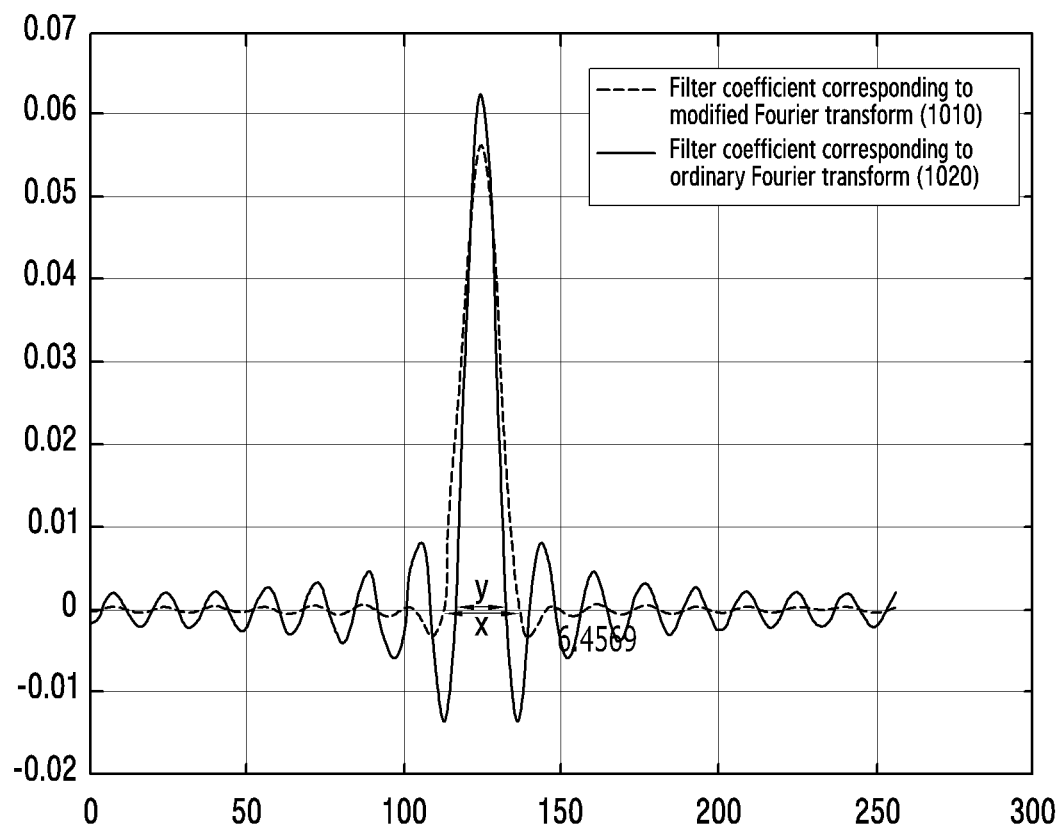
FIG. 10 is a graph of filter coefficients in a time domain in a wireless communication system, according to an embodiment.

FIG. 10 is a graph of filter coefficients in a time domain in a wireless communication system, according to an embodiment. In the graph illustrated in FIG. 10, the axis of abscissa denotes a filter coefficient index, and the axis of ordinate denotes a filter coefficient value corresponding to the filter coefficient index.

Referring to FIG. 10, the filter coefficient 1010 denotes filter coefficients corresponding to a modified Fourier transform in the time domain, and the filter coefficient 1020 denotes filter coefficients corresponding to an ordinary Fourier transform in the time domain. The maximum value of the filter coefficient 1010 in the time domain is smaller than the maximum value of the filter coefficient 1020, and the width (x) of the maximum pulse of the filter coefficient 1010 is larger than the width (y) of the maximum pulse of the filter coefficient 1020. The filter of filter coefficients corresponding to the modified Fourier transform in the frequency domain may have a smaller gain and a small bandwidth compared with a filter of filter coefficients corresponding to the ordinary Fourier transform.

Figure 11A:
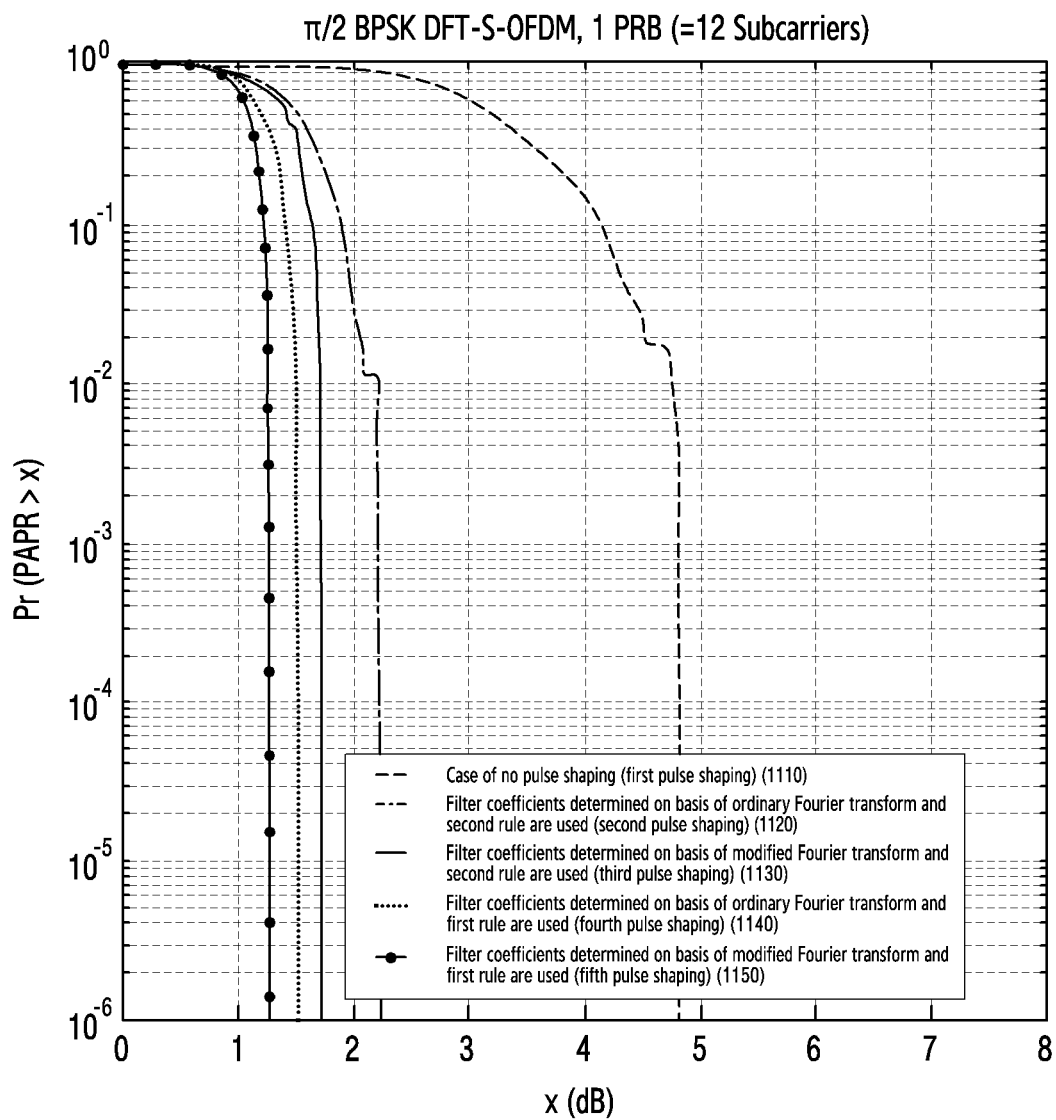
FIG. 11A is a graph of a relationship between the type of pulse shaping and the performance of peak-to-average power ratio (PAPR) reduction, according to an embodiment.
Figure 11B:
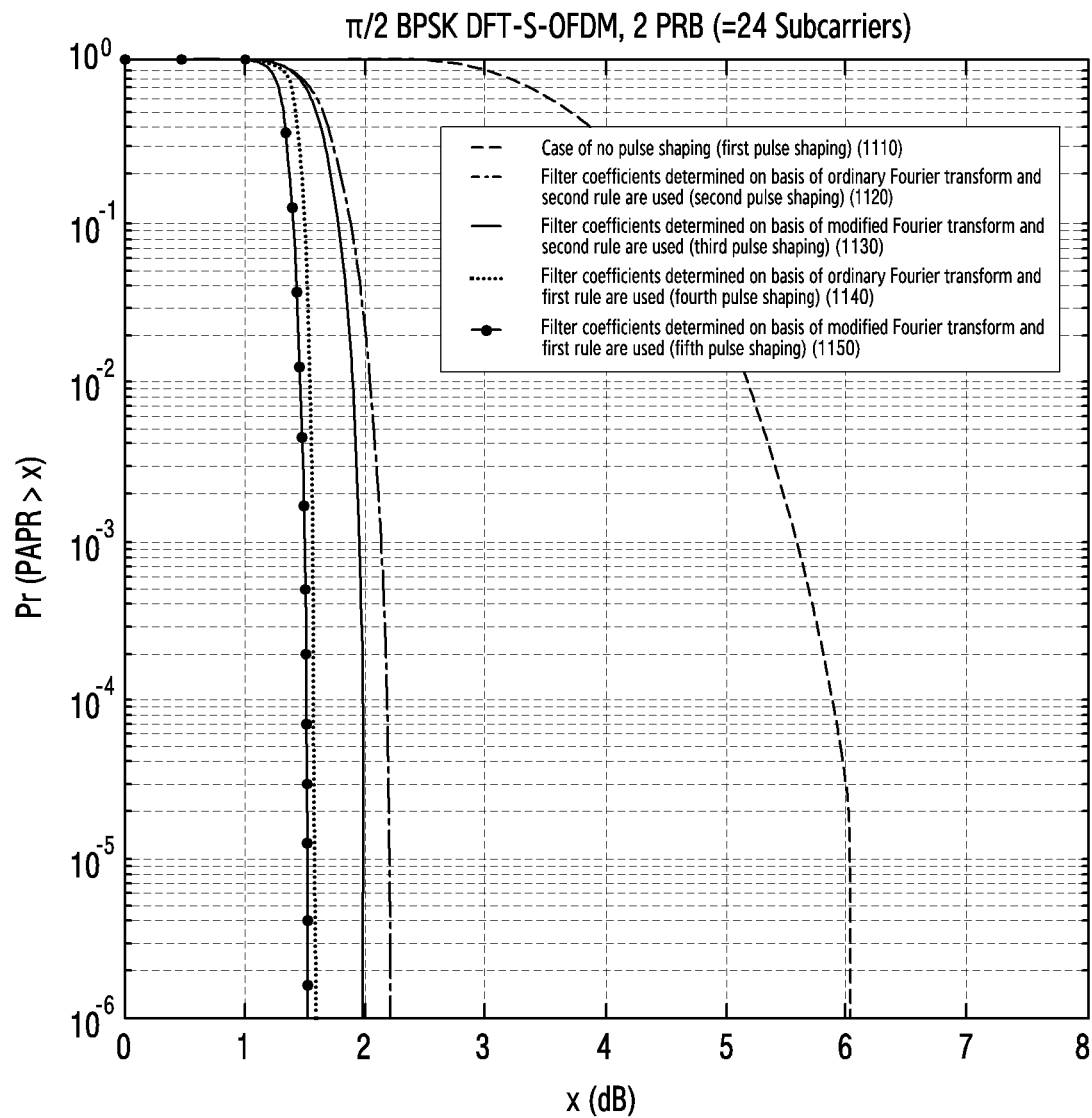
FIG. 11B is a graph of a relationship between the type of pulse shaping and the performance of PAPR reduction, according to an embodiment.
Figure 11C:
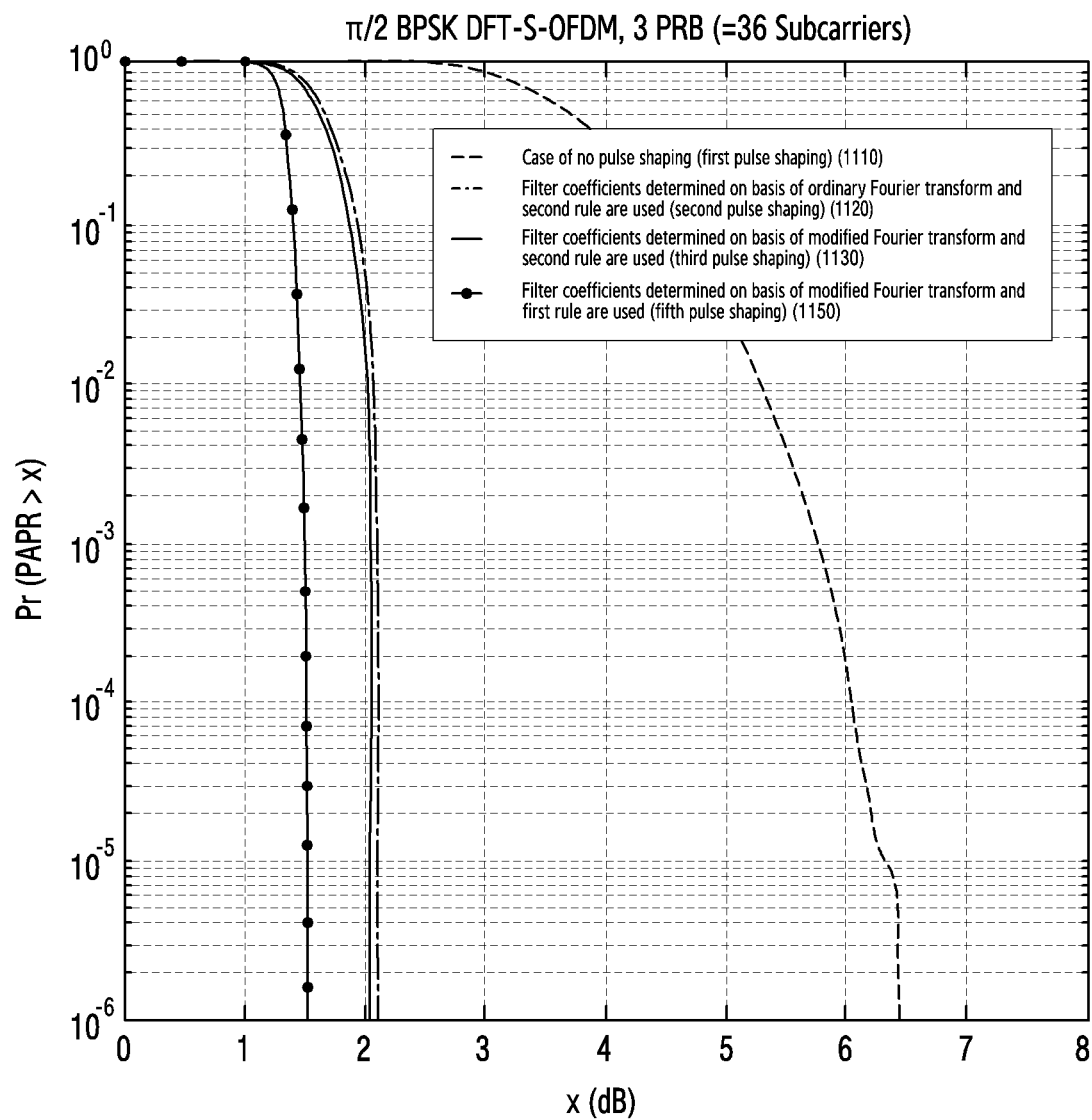
FIG. 11C is a graph of a relationship between the type of pulse shaping and the performance of PAPR reduction, according to an embodiment.
Figure 11D:
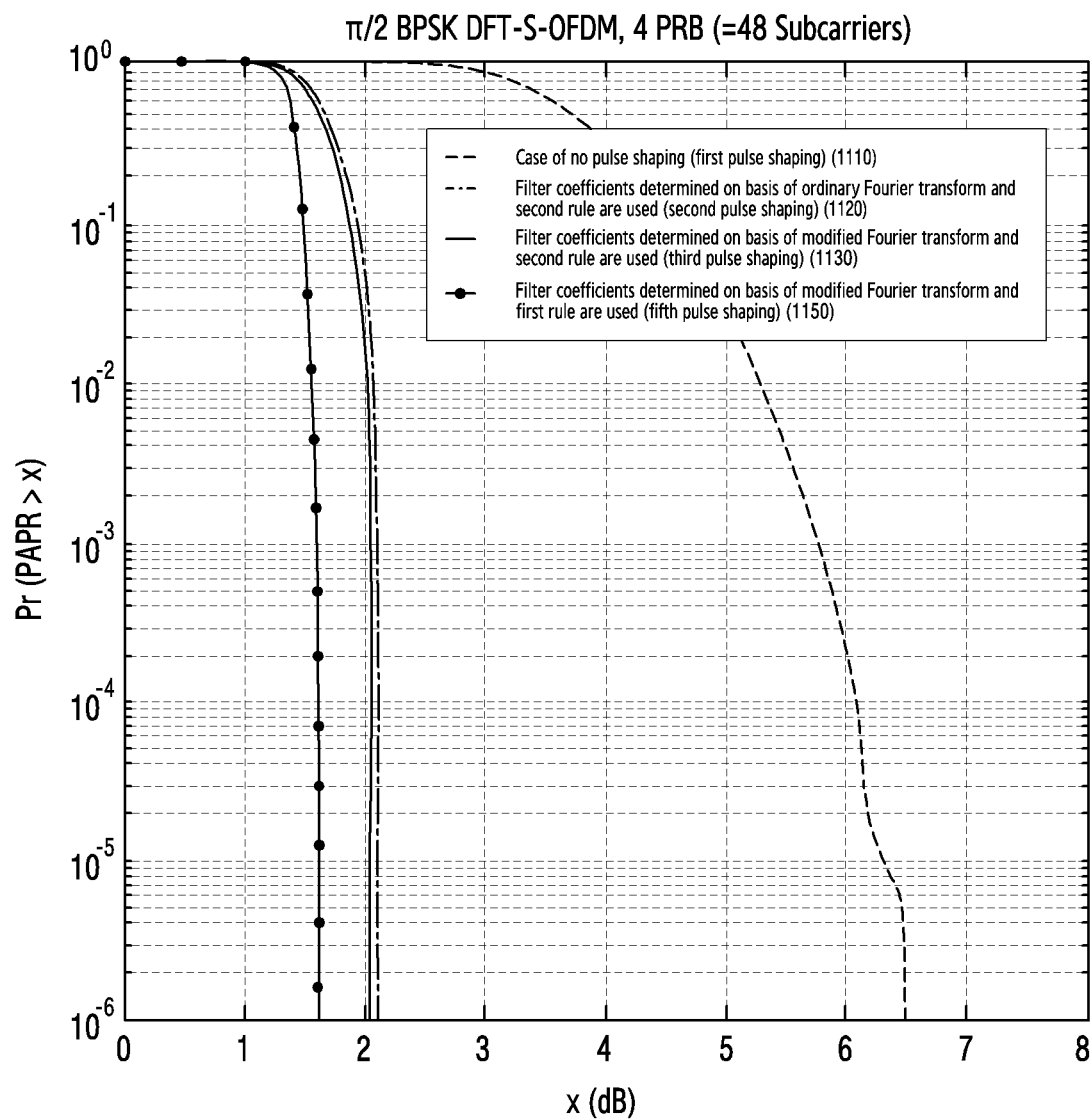
FIG. 11D is a graph of a relationship between the type of pulse shaping and the performance of PAPR reduction, according to an embodiment.

FIG. 11A is a graph illustrating a relationship between the type of pulse shaping and the performance of PAPR reduction, according to an embodiment. FIG. 11B is a graph illustrating a relationship between the type of pulse shaping and the performance of PAPR reduction, according to an embodiment. FIG. 11C is a graph illustrating a relationship between the type of pulse shaping and the performance of PAPR reduction, according to an embodiment. FIG. 11D is a graph illustrating a relationship between the type of pulse shaping and the performance of PAPR reduction. In each of the graphs illustrated in FIG. 11A to FIG. 11D, the axis of abscissa denotes power x (decibel (dB) unit), and the axis of ordinate denotes a probability that the PAPR will be larger than the power x.

The type of pulse shaping may include at least one of first pulse shaping 1110 corresponding to a case in which pulse shaping is not performed, second pulse shaping 1120 corresponding to a case in which filter coefficients determined based on an ordinary Fourier transform and a second rule are used, third pulse shaping 1130 corresponding to a case in which filter coefficients determined based on a modified Fourier transform and a second rule are used, fourth pulse shaping 1140 corresponding to a case in which filter coefficients determined based on an ordinary Fourier transform and a first rule are used, or fifth pulse shaping 1150 corresponding to a case in which filter coefficients determined based on a modified Fourier transform and a first rule are used.

FIG. 11A is a graph illustrating a relationship between the type of pulse shaping and the performance of PAPR reduction when the modulation scheme is $\pi/2$ BPSK, when DFT-S-OFDM is performed (i.e., an ordinary Fourier transform or a modified Fourier transform is performed), and when a transmission signal is assigned to one PRB (=12 subcarriers). FIG. 11B is a graph illustrating a relationship between the type of pulse shaping and the performance of PAPR reduction when the conditions are the same as in the case of FIG. 11A except that a transmission signal is assigned to two PRBs (=24 subcarriers). FIG. 11C is a graph illustrating a relationship between the type of pulse shaping and the performance of PAPR reduction when the conditions are the same as in the case of FIG. 11A except that a transmission signal is assigned to three PRBs (=36 subcarriers). FIG. 11D is a graph illustrating a relationship between the type of pulse shaping and the performance of PAPR reduction when the conditions are the same as in the case of FIG. 11A except that a transmission signal is assigned to four PRBs (=48 subcarriers).

According to FIG. 11A to FIG. 11D, the performance of PAPR reduction of the case in which the second pulse shaping 1120 is used is more excellent than the case in which the first pulse shaping 1110 is used (i.e., when pulse shaping is not used). The performance of PAPR reduction of the case in which the third pulse shaping 1130 is used is more excellent than the case in which the second pulse shaping 1120 is used. The performance of PAPR reduction of the case in which the fourth pulse shaping 1140 is used is more excellent than the case in which the third pulse shaping 1130 is used. The performance of PAPR reduction of the case in which the fifth pulse shaping 1150 is used is more excellent than the case in which the fourth pulse shaping 1140 is used. When a modified Fourier transform and filter coefficients corresponding to the modified Fourier transform are used, the performance of PAPR is excellent, and the PAPR may be reduced by a relatively large extent. In addition, when filter coefficients determined based on the first rule are used, the performance of PAPR reduction is excellent, and the PAPR may be reduced by a relatively large extent.

According to FIG. 11A to FIG. 11D, the larger the number of PRBs to which a transmission signal is allocated (or the number of subcarriers), the smaller the difference in the performance of PAPR reduction between types of pulse shaping may become. The smaller the number of PRBs to which a transmission signal is allocated (or the number of subcarriers), the larger the influence due to phase difference mismatch may become, and the difference in the performance of PAPR reduction between types of pulse shaping may accordingly increase. In contrast, the larger the number of PRBs to which a transmission signal is allocated (or the number of subcarriers), the smaller the influence due to phase difference mismatch may become, and the difference in the performance of PAPR reduction between types of pulse shaping may accordingly decrease.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof

What is claimed is:

1. A method for operating a transmission device in a wireless communication system, the method comprising:
   generating modulation symbols based on a modulation scheme;
   generating transformed data by applying a modified Fourier transform to the modulation symbols;
   generating a transmission signal based on the transformed data; and
   transmitting the transmission signal,
   wherein the modified Fourier transform applies an amount of phase change to each of the modulation symbols, and
   wherein the amount of phase change is shifted from an amount of reference phase change by a phase offset.

2. The method of claim 1, wherein the amount of reference phase change is an amount of phase change applied to each of the modulation symbols when an ordinary Fourier transform is applied to the modulation symbols, and
   wherein the phase offset is determined based on at least one of a type of index that is shifted from the amount of reference phase change or the offset by which each index is shifted.

3. The method of claim 1, wherein generating the transmission signal comprises generating a filter output by applying a filter for shaping a waveform of the transmission signal to the transformed data, and
   wherein filter coefficients of the filter are determined based on the type of Fourier transform comprising the modified Fourier transform.

4. The method of claim 3, wherein the filter coefficients are predetermined values corresponding to a number of subcarriers to which the transmission signal is allocated.

5. The method of claim 3, wherein generating the transmission signal further comprises:
   identifying a number of subcarriers to which the transmission signal is allocated; and
   generating the filter coefficients based on the identified number of subcarriers.

6. The method of claim 3, wherein the transformed data and the filter coefficients are composed of real values.

7. The method of claim 3, wherein generating the transmission signal further comprises:
   generating a time-domain signal by applying an inverse Fourier transform to the filter output,
   wherein phase difference mismatch occurring in the time-domain signal when the modified Fourier transform is applied is smaller than in the case in which an ordinary Fourier transform is applied, and
   wherein the phase difference mismatch indicates the degree of mismatch between a phase difference of component signals regarding adjacent subcarriers in the dome-domain signal and a phase difference of adjacent modulation symbols among the modulation symbols.

8. The method of claim 1, wherein the modulation scheme comprises at least one of quadrature phase shift keying (QPSK), 16 quadrature amplitude modulation (QAM), 64 QAM, 256 QAM, or π/2-binary phase shift keying (BPSK).

9. The method of claim 1, wherein the modulation scheme comprises a scheme for generating the modulation symbols such that phases of adjacent modulation symbols among the modulation symbols are perpendicular to each other.

10. The method of claim 1, further comprising determining whether to apply the modified Fourier transform to the modulation symbols or to apply an ordinary Fourier transform to the modulation symbols based on at least one of:
    a channel quality,
    a modulation order,
    a number of subcarriers to which the transmission signal is allocated,
    a type of information included in the transmission signal,
    a subcarrier interval,
    a battery power level of the transmission device,
    a battery capacity of the transmission device, or
    a performance of a power amplifier of the transmission device.

11. A transmission device in a wireless communication system, the transmission device comprising:
    at least one processor configured to:

generate modulation symbols based on a modulation scheme, generate transformed data by applying a modified Fourier transform to the modulation symbols, and generate a transmission signal based on the transformed data; and a communication unit configured to transmit the transmission signal, wherein the modified Fourier transform applies an amount of phase change to each of the modulation symbols, and wherein the amount of phase change is shifted from an amount of reference phase change by a phase offset.

12. The transmission device of claim 11, wherein the amount of reference phase change is an amount of phase change applied to each of the modulation symbols when an ordinary Fourier transform is applied to the modulation symbols, and wherein the phase offset is determined based on at least one of a type of index that is shifted from the amount of reference phase change or the offset by which each index is shifted.

13. The transmission device of claim 11, wherein the at least one processor is further configured to generate a filter output by applying a filter for shaping a waveform of the transmission signal to the transformed data, and wherein filter coefficients of the filter are determined based on the type of Fourier transform comprising the modified Fourier transform.

14. The transmission device of claim 13, wherein the filter coefficients are predetermined values corresponding to a number of subcarriers to which the transmission signal is allocated.

15. The transmission device of claim 13, wherein the at least one processor is further configured to:

identify a number of subcarriers to which the transmission signal is allocated, and generate the filter coefficients based on the identified number of subcarriers.

16. The transmission device of claim 13, wherein the transformed data and the filter coefficients are composed of real values.

17. The transmission device of claim 13, wherein the at least one processor is further configured to generate a time-domain signal by applying an inverse Fourier transform to the filter output, wherein phase difference mismatch occurring in the time-domain signal when the modified Fourier transform is applied is smaller than in the case in which an ordinary Fourier transform is applied, and wherein the phase difference mismatch indicates the degree of mismatch between a phase difference of component signals regarding adjacent subcarriers in the dome-domain signal and a phase difference of adjacent modulation symbols among the modulation symbols.

18. The transmission device of claim 11, wherein the modulation scheme comprises at least one of quadrature phase shift keying (QPSK), 16 quadrature amplitude modulation (QAM), 64 QAM, 256 QAM, or $\pi/2$-binary phase shift keying (BPSK).

19. The transmission device of claim 11, wherein the modulation scheme comprises a scheme for generating the modulation symbols such that phases of adjacent modulation symbols among the modulation symbols are perpendicular to each other.

20. The transmission device of claim 11, wherein the at least one processor is further configured to determine whether to apply the modified Fourier transform to the modulation symbols or to apply an ordinary Fourier transform to the modulation symbols based on at least one of:

a channel quality, a modulation order, a number of subcarriers to which the transmission signal is allocated, a type of information included in the transmission signal, a subcarrier interval, a battery power level of the transmission device, a battery capacity of the transmission device, or a performance of a power amplifier of the transmission device.

\* \* \* \* \*